(12) United States Patent
Kondogiani et al.

(10) Patent No.: US 9,850,852 B2
(45) Date of Patent: Dec. 26, 2017

(54) COMPRESSED GAS CAPTURE AND RECOVERY SYSTEM

(71) Applicant: Third Shore Group, LLC, Royal Oak, MI (US)

(72) Inventors: Christopher T. Kondogiani, Novi, MI (US); Michael F. Donoughe, Rochester, MI (US)

(73) Assignee: Third Shore Group, LLC, Royal Oak, MI (US)

(*) Notice: Subject to any disclaimer, the term of this patent is extended or adjusted under 35 U.S.C. 154(b) by 0 days.

(21) Appl. No.: 15/209,335

(22) Filed: Jul. 13, 2016

(65) Prior Publication Data
US 2017/0030300 A1 Feb. 2, 2017

Related U.S. Application Data

(60) Provisional application No. 62/217,165, filed on Sep. 11, 2015, provisional application No. 62/198,833, filed on Jul. 30, 2015.

(51) Int. Cl.
| | | |
|---|---|---|
| *F02M 21/00* | (2006.01) | |
| *F02M 21/02* | (2006.01) | |
| *F02D 19/02* | (2006.01) | |
| *F02D 41/00* | (2006.01) | |

(Continued)

(52) U.S. Cl.
CPC ....... *F02M 21/0224* (2013.01); *F02D 19/029* (2013.01); *F02D 41/0027* (2013.01); *F02M 21/0215* (2013.01); *F02M 21/0242* (2013.01); *F02M 21/0293* (2013.01); *F17C 1/04* (2013.01); *F17C 13/025* (2013.01); *F02D 41/003* (2013.01); *Y02T 10/32* (2013.01)

(58) Field of Classification Search
CPC .......... F02M 21/0224; F02M 21/0218; F02M 21/0221; F02M 21/0215; F02M 21/0293; F02M 21/0242; F17C 1/04; F17C 13/025; F02D 41/003; F02D 41/0027; F02D 19/029; Y02T 10/32
USPC .................................................. 123/525, 527
See application file for complete search history.

(56) References Cited

U.S. PATENT DOCUMENTS 4,108,219 A * 8/1978 Shulsinger ............. B65D 83/64
141/20
5,462,021 A * 10/1995 Minami ................ C01B 3/0005
123/3

(Continued)

FOREIGN PATENT DOCUMENTS

| CN | 103879978 A | 6/2014 |
|---|---|---|
| EP | 458359 B1 | 3/1994 |

(Continued)

*Primary Examiner* — Hai Huynh
(74) *Attorney, Agent, or Firm* — Young Basile Hanlon & MacFarlane, P.C.

(57) ABSTRACT

A method and system for recycling permeated gas is disclosed. A container encapsulating a pressure vessel defines a containment volume. Gas permeating through the pressure vessel is captured in the containment volume. When a sensor detects a threshold level of permeated gas captured within the containment volume, a control module sends a command to open a purge valve. The open purge valve allows permeated gas captured within the containment volume to be supplied to an engine, a repressurization unit, or a secondary container.

20 Claims, 2 Drawing Sheets

(51) Int. Cl.
    *F17C 1/04*           (2006.01)
    *F17C 13/02*         (2006.01)

(56) References Cited

U.S. PATENT DOCUMENTS

| | | | | |
|---|---|---|---|---|
| 6,453,885 | B1 * | 9/2002 | Short | B60K 15/03177 |
| | | | | 123/516 |
| 6,460,733 | B2 * | 10/2002 | Acker | H01M 8/04186 |
| | | | | 222/1 |
| 6,527,075 | B1 * | 3/2003 | Izuchukwu | F17C 1/02 |
| | | | | 180/69.5 |
| 6,634,321 | B2 * | 10/2003 | Hussain | B82Y 30/00 |
| | | | | 123/3 |
| 6,742,554 | B1 * | 6/2004 | Immel | F17C 1/00 |
| | | | | 137/264 |
| 6,988,358 | B2 | 1/2006 | Mehail | |
| 8,046,990 | B2 | 11/2011 | Bollinger et al. | |
| 8,114,554 | B2 * | 2/2012 | Drake | H01M 8/04208 |
| | | | | 220/4.12 |
| 8,209,974 | B2 | 7/2012 | McBride et al. | |
| 9,079,489 | B2 * | 7/2015 | McAlister | B60K 15/035 |
| 2008/0142377 | A1 * | 6/2008 | Suzuki | F17C 11/005 |
| | | | | 206/7 |
| 2013/0312430 | A1 | 11/2013 | Suppes | |

FOREIGN PATENT DOCUMENTS

| | | |
|---|---|---|
| JP | 05059662 B2 | 10/2012 |
| WO | 2013083156 A1 | 6/2013 |
| WO | 2014094070 A1 | 6/2014 |

* cited by examiner

COMPRESSED GAS CAPTURE AND RECOVERY SYSTEM

CROSS REFERENCE TO RELATED APPLICATION

The present application claims priority to U.S. Provisional App. No. 62/198,833 for a "Compressed Gas Capture and Recovery System" filed Jul. 30, 2015 and U.S. Provisional App. No. 62/217,165 for a "Compressed Gas Capture and Recovery System" filed Sep. 11, 2015, the contents of which are incorporated herein by reference in their entireties.

BACKGROUND

Compressed gas can be used as a fuel to provide benefits such as lower pollution levels and lower refining costs than, for example, liquid fuels such as gasoline or diesel fuel. Using compressed gas as a vehicle fuel or for industrial applications requires that the gas be transportable, refillable, and safely stored.

The storage of compressed gas, such as hydrogen or compressed natural gas (CNG), is particularly challenging, as the gas must be stored at a very high pressure in order to achieve acceptable storage density. Given the high pressure level needed to store a sufficient amount of gas, leaks can occur at fittings, or gas can permeate through the walls of the pressure vessel used to store the gas.

The amount of permeation of gas through the walls of a pressure vessel is based on the product of a material permeation coefficient, the surface area of the pressure vessel walls in contact with the gas, and the pressure level of the gas divided by the sectional thickness of the pressure vessel wall material. Thus, the resistance to permeation of a pressure vessel constructed of a particular material is proportional to the surface area of the walls and pressure of the gas and inversely proportional to the material thickness of the pressure vessel.

Gas permeation levels are regulated to reduce environmental and user impact. The current NGV2 standard allows a steady state permeation rate of fuel lost to the atmosphere of 0.25 cc of natural gas per hour per liter of water capacity. Given a 40 DGE pressure vessel (550 liters of water capacity), 3.5 cubic feet, or approximately one percent, of the natural gas within the pressure vessel can permeate the walls of the pressure vessel each year. Though this is a relatively small amount, gas permeation near the NGV2 standard levels can still cause a safety concern or an olfactory nuisance in enclosed spaces such as homes or garages, forcing some compressed gas vehicle owners to park vehicles in open spaces. Mercaptans from natural gas are designed to be detected by the human nose at 1,000 ppm, so even small amounts of permeation can be undesirable to, for example, users of CNG pressure vessels.

Compressed gas pressure vessels are currently designed to restrict permeation to meet or exceed regulatory levels using expensive materials or other suboptimal solutions such as increased material thickness to improve mechanical and chemical resistance to permeation. Increasing material thickness adds weight to pressure vessels that are already quite heavy based on design requirements to withstand high pressures from the stored compressed gas. This is undesirable for the vehicle manufacturer.

Another existing solution to address gas permeation is to use an unsealed, vented cabinet to hold a pressure vessel. However, these cabinets can release permeated gas in an uncontrolled manner or the user is required to occasionally vent the compressed gas from the cabinet to the atmosphere to avoid high concentrations in the enclosed cabinet. This type of cabinet cannot safely contain permeated gas for any period of time.

SUMMARY

A compressed gas permeation recovery system is disclosed. The system includes a two-stage permeation barrier. First, a pressure vessel includes a traditional barrier of reinforced pressure vessel walls configured to contain a high-pressure gaseous fuel. Next, a sealed container including a vapor barrier surrounds the pressure vessel and blocks lower pressure gas that escapes from the pressure vessel by leakage or permeation from entering the atmosphere. Finally, a recovery system is coupled to the sealed container, allowing safe recovery of the captured gas present at the lower pressure level within the container.

In one aspect of the disclosure, a method of recycling permeated gas is disclosed. The method includes capturing permeated gas in a containment volume defined by a container. The permeated gas escapes from a pressure vessel supplying compressed gas to an engine through a main fuel line. The container encapsulates the pressure vessel. The method also includes detecting, using a sensor, a threshold level of permeated gas captured within the containment volume of the container. Based on detecting the threshold level of permeated gas, permeated gas is supplied from the containment volume to the engine. Supplying the permeated gas includes sending a command, from a control module, to modify a position of a purge valve.

In another aspect of the disclosure, another method of recycling permeated gas is disclosed. The method includes capturing permeated gas in a containment volume defined by a container. The permeated gas escapes from a pressure vessel supplying compressed gas to an engine through a main fuel line. The container encapsulates the pressure vessel. The method also includes detecting, using a sensor, a threshold level of permeated gas captured within the containment volume of the container. Based on detecting the threshold level of permeated gas, permeated gas is supplied from the containment volume to a repressurization unit. Supplying the permeated gas includes sending a command, from a control module, to modify a position of a purge valve.

In yet another aspect of the disclosure, a system for recycling permeated gas is disclosed. The system includes a container defining a containment volume for capturing permeated gas escaping from a pressure vessel. The pressure vessel supplies compressed gas to an engine through a main fuel line. The container encapsulates the pressure vessel within the containment volume. A sensor detects a threshold level of permeated gas captured within the containment volume of the container. A purge valve is in fluid communication with the containment volume. A control module is operable to send commands to modify a position of the purge valve to vent the permeated gas captured within the containment volume based on the sensor detecting the threshold level of permeated gas within the containment volume.

BRIEF DESCRIPTION OF THE DRAWINGS

The description makes reference to the accompanying drawings wherein.

DETAILED DESCRIPTION

The compressed gas capture and recovery system described herein is configured to retain and recover gas that leaks from or permeates through the walls of a pressure vessel. In one embodiment, a container including a vapor-resistant barrier or liner is designed to surround the pressure vessel. In addition to a main fuel line allowing gaseous fuel to exit the pressure vessel, the container includes a recovery fuel line and purge valve designed to redirect captured gas from the space within the barrier and outside pressure vessel. Both the recovery fuel line and main fuel line can provide gaseous fuel under the direction of a control module. In the example of an internal combustion engine, the gaseous fuel can be CNG and the controller can provide a mix of CNG with air from an intake manifold to fuel an internal combustion engine.

Figure 1:
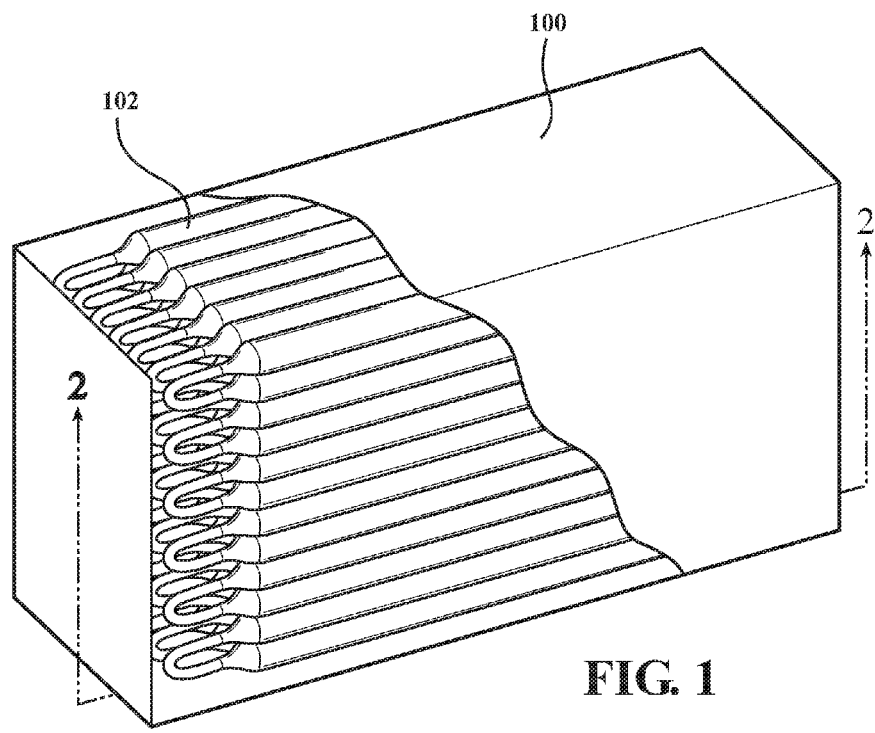
FIG. 1 is a perspective partial cutaway view of a sealed container including a compressed gas pressure vessel.

FIG. 1 is a perspective cutaway view of a sealed container 100 including a compressed gas pressure vessel 102. The container 100 can be formed, for example, of a metallic or plastic enclosure. The pressure vessel 102 can be a conformable tank comprised of a a continuous chain of cylindrical, elongated, main vessel portions and alternating reduced diameter intermediate portions that allow the pressure vessel 102 to flex and bend to fit within a variety of container shapes, including the sealed container 100.

The pressure vessel 102 shown in FIG. 1 is configured for use in a 3,600 PSI natural gas vehicle application. In alternative embodiments, the pressure vessel 102 can include main vessel portions of varying shapes, such as ovoid shapes or spherical shapes. In other alternative embodiments, the pressure vessel 102 can include a singular main vessel portion without flexible reduced diameter intermediate portions.

Figure 2:
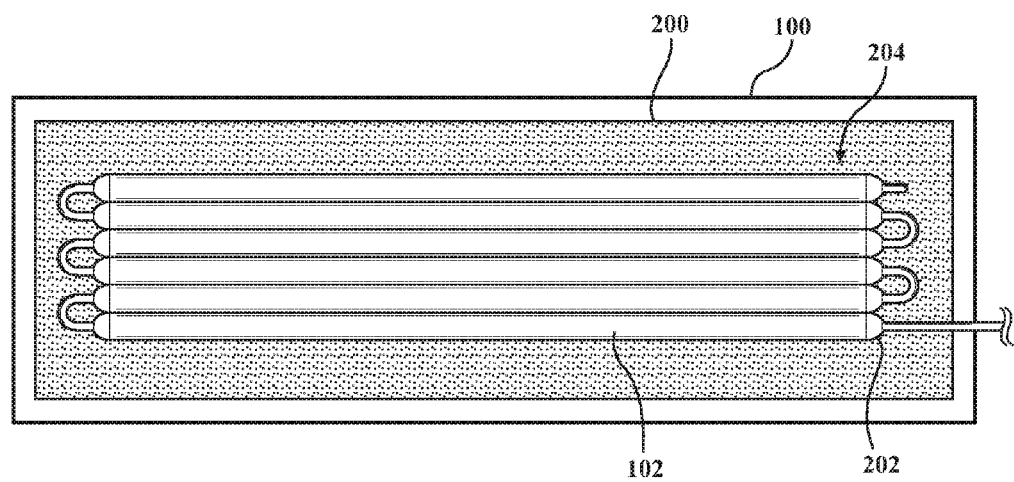
FIG. 2 is sectional view through the sealed container of FIG. 1.

FIG. 2 is sectional view through the sealed container 100 of FIG. 1. The sealed container 100 includes a gaseous barrier 200 encapsulating the pressure vessel 102. The gaseous barrier 200 serves to block gas from exiting the container 100. The gaseous barrier 200 can be, for example, a vapor resistant layer that has material properties selected specifically to resist permeation of a specific form of gas, for example, CNG. In some examples, the vapor resistant layer can be formed from materials similar to the rest of the pressure vessel 102, such as hytrel or nylon, but need only be designed for installation within the container 100 using a material thickness sufficient to improve permeation performance at the low pressure level present in the container 100.

The main vessel portions of the pressure vessel 102 within the sealed container 100 can include a reinforcing layer 202. The reinforcing layer 202 can be a braided treatment applied to the exterior of the main vessel portions but not to the reduced diameter intermediate portions of the pressure vessel 102. The braiding process can include encasing the pressure vessel 102 in high strength fiber material, such as rayon, nylon, glass, or Kevlar® (aramid), or a combination thereof to form the reinforcing layer 202. Other treatments for the exterior reinforcing layer 202, such as carbon fiber or glass fiber overbraids or sleeves are also possible.

The walls of the pressure vessel 102 and the reinforcing layer 202 serve to limit the amount of permeation of gas from the pressure vessel 102. Further, the pressure level outside the pressure vessel 102, but within the gaseous barrier 200, is significantly lower than the pressure within the pressure vessel 102, in fact, approaching ambient pressure. Because of the lower pressure level and the small amount of gas present, the gaseous barrier 200 is able to contain most, if not all, of the gas that escapes the pressure vessel 102 (a result of the permeation function of the gaseous barrier 200 described above). The escaped gas held within the container 100 by the gaseous barrier 200 is referred to below as captured gas 204. The captured gas 204 is shown in FIG. 2 using a stippling shading to represent the gaseous molecules.

In other embodiments, the volume of the external container 100 can be reduced or the container 100 can be wholly eliminated when the main sections of a conformable pressure vessel 102 are tightly packed and/or include sufficient interstitial spaces to act as a containment volume to capture gas escaping the pressure vessel 102. In the example where the container 100 is eliminated, a gaseous barrier 200 can be disposed directly around the tightly packed main sections of the conformable pressure vessel 102. A recovery apparatus, relying on a pressure differential in the case of use with an internal combustion engine (further described below) or using a pump in other cases, can be coupled to the sealed container 100 to collect and redirect the captured gas 204. Once collected, the captured gas 204 can then be re-pressurized and, for example, stored back in the pressure vessel 102, stored in a secondary tank or vessel, or used in an internal combustion engine in the case of a vehicle fuel application.

Figure 3:
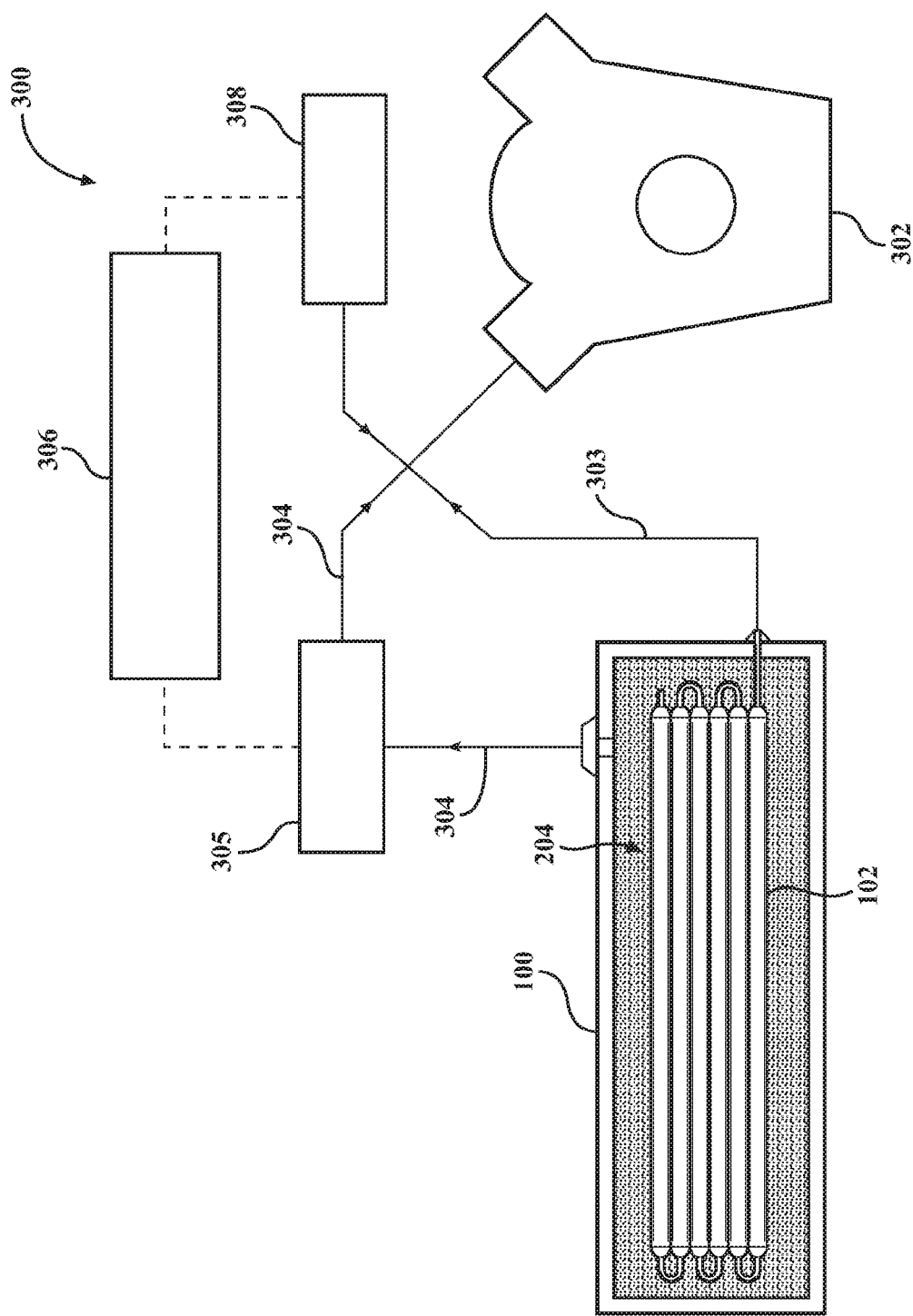
FIG. 3 is a schematic view of a compressed gas capture and recovery system for use with an internal combustion engine.

FIG. 3 is a schematic view of a compressed gas capture and recovery system 300 for use with an internal combustion engine 302. The system 300 can include the container 100 and pressure vessel 102 of FIGS. 1 and 2. The pressure vessel 102 can provide gaseous fuel directly to the engine 302 through a main fuel line 303. The pressure vessel 102 can also provide gaseous fuel to the engine 302 through a recovery fuel line 304. A purge valve 305 is disposed along the recovery fuel line 304, the purge valve 305 being configured to block or vent captured gas 204 from the container 100 depending on the position of the purge valve 305, that is, whether the purge valve 305 is open or closed. The purge valve 305 can be controlled by a control module 306. The control module 306 can also be configured to control an intake manifold 308, the intake manifold 308 providing air to the internal combustion engine 302 for mixing with gaseous fuel from both the main fuel line 303 and from the recovery fuel line 304.

The control module 306 can be any type or form of computing device, or can be composed of multiple computing devices. The control module 306 can include or be coupled to a conventional central processing unit (CPU) or any other type of device, or multiple devices, capable of manipulating or processing information. The control module 306 can also include or be coupled to a memory for storing data and program instructions used by the CPU. The memory can be a random access memory device (RAM) or any other suitable type of storage device. The memory can include data that is accessed by the CPU using a bus. The memory can also include an operating system and installed applications, the installed applications including programs that permit the CPU to perform the gas capture and recovery methods described here.

When the control module 306 receives a signal, for example, from a sensor disposed within the container 100 and configured to detect a predetermined threshold level amount of captured gas 204 within the container 100, the purge valve 305 can be sent a command to vent the captured gas 204, allowing the gas to flow to the engine 302. The predetermined threshold level can be based on the pressure level within the container 100 and chosen to prevent over pressurization, for example, 3 psi. Other predetermined threshold levels are also possible. The flow of gas to the engine 302 can be driven by the pressure differential between the container 100 (e.g., higher pressure) and the pressure level in the intake manifold 308 (e.g., lower pressure or vacuum), the intake manifold 308 being in fluid communication with the recovery fuel line 304. This venting process effectively empties the container 100 of any captured gas 204.

The compressed gas capture and recovery system 300 described here improves performance of gaseous-fueled vehicles by increasing fuel economy (based on less fuel being lost to gaseous emissions from the pressure vessel 102) and allows compressed gas vehicles to be safely stored indoors. This reduction in gas lost to permeation or leaking is significant, improving overall safety of any vehicle using the system 300 as well as reducing operating costs for that vehicle. Additionally, the use of exotic or expensive materials to completely eliminate permeation from the pressure vessel 102 can be reduced, leading to a more cost effective fuel system for a vehicle. Though the example described in respect to FIG. 3 is based on an internal combustion engine 302 and vehicle application, other uses, such as industrial uses, are also possible for the compressed gas capture and recovery system 300.

While this disclosure includes what is presently considered to be the most practical and preferred embodiments, it is to be understood that the disclosure is not to be limited to the disclosed embodiments but, on the contrary, is intended to cover various modifications and equivalent arrangements.

What is claimed is:

1. A method of recycling permeated gas, the method comprising:
    capturing permeated gas in a containment volume defined by a container,
        wherein the permeated gas escapes from a pressure vessel supplying compressed gas to an engine through a main fuel line, and
        wherein the container encapsulates the pressure vessel;
    detecting, using a sensor, a threshold level of permeated gas captured within the containment volume of the container; and
    based on detecting the threshold level of permeated gas, supplying the permeated gas from the containment volume to the engine, wherein supplying the permeated gas includes sending a command, from a control module, to modify a position of a purge valve.

2. The method of claim 1, wherein the container comprises a gaseous barrier encapsulating the pressure vessel.

3. The method of claim 1, wherein the pressure vessel comprises a chain of alternating main vessel portions having a first diameter and intermediate portions having a second diameter smaller than the first diameter.

4. The pressure vessel of claim 3, wherein the main vessel portions have at least one of an elongated cylindrical shape, an ovoid shape, and a spherical shape.

5. The pressure vessel of claim 3, wherein the main vessel portions include an exterior reinforcing layer.

6. The method of claim 3, wherein the container defines an interstitial space between the alternating main vessel portions of the pressure vessel to capture the permeated gas escaping from the pressure vessel.

7. The method of claim 1, wherein the pressure vessel comprises a singular main vessel portion without reduced diameter intermediate portions.

8. The method of claim 1, wherein the threshold level is based on a predetermined pressure level of the permeated gas within the containment volume.

9. The method of claim 1, wherein supplying compressed gas to the engine includes mixing compressed gas with air from an intake manifold.

10. The method of claim 9, wherein the threshold level is based on a predetermined pressure differential between a pressure within the containment volume and a pressure within the intake manifold.

11. The method of claim 1, wherein a pressure level of the permeated gas within the containment volume is lower than a pressure level of the compressed gas inside of the pressure vessel.

12. A method of recycling permeated gas, the method comprising:
    capturing permeated gas in a containment volume defined by a container,
        wherein the permeated gas escapes from a pressure vessel supplying compressed gas to an engine through a main fuel line, and
        wherein the container encapsulates the pressure vessel;
    detecting, using a sensor, a threshold level of permeated gas captured within the containment volume of the container; and
    based on the sensor detecting the threshold level of permeated gas in the containment volume, supplying the permeated gas from the containment volume to a repressurization unit, wherein supplying the permeated gas includes sending a command, from a control module, to modify a position of a purge valve.

13. The method of claim 12, further comprising:
    supplying compressed permeated gas from the repressurization unit to the pressure vessel.

14. The method of claim 12, further comprising:
    supplying compressed permeated gas from the repressurization unit to a secondary container.

15. The method of claim 12, wherein the container comprises a gaseous barrier encapsulating the pressure vessel.

16. A system for recycling permeated gas, comprising:
    a container defining a containment volume for capturing permeated gas escaping from a pressure vessel,
        wherein the pressure vessel supplies compressed gas to an engine through a main fuel line, and
        wherein the container encapsulates the pressure vessel within the containment volume;
    a purge valve in fluid communication with the containment volume,
        wherein the purge valve has a first position to vent the permeated gas captured within the containment volume, and
        wherein the purge valve has a second position to block flow of the permeated gas captured within the containment volume; and
    a recovery fuel line in fluid communication with the containment volume, wherein the purge valve is located along the recovery fuel line.

17. The system of claim 16, wherein the recovery fuel line supplies permeated gas from the containment volume to the engine.

18. The system of claim 16, wherein the recovery fuel line supplies permeated gas from the containment volume to a repressurization unit.

19. The system of claim 16, wherein the recovery fuel line supplies permeated gas from the containment volume to a secondary container.

20. The system of claim 16, wherein a pressure level of the permeated gas within the containment volume is lower than a pressure level of the compressed gas inside of the pressure vessel.

* * * * *